United States Patent
Anderson

(10) Patent No.: US 10,452,353 B2
(45) Date of Patent: Oct. 22, 2019

(54) WORK MACHINE EVENT CAPTURE

(71) Applicant: Deere & Company, Moline, IL (US)

(72) Inventor: Eric R. Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 10 days.

(21) Appl. No.: 15/800,235

(22) Filed: Nov. 1, 2017

(65) Prior Publication Data

US 2019/0129690 A1 May 2, 2019

(51) Int. Cl.
*G05D 1/02* (2006.01)
*G06F 5/06* (2006.01)

(52) U.S. Cl.
CPC ............ *G06F 5/06* (2013.01); *G05D 1/0246* (2013.01); *B60R 2300/105* (2013.01); *G05D 2201/0202* (2013.01)

(58) Field of Classification Search
CPC combination set(s) only.
See application file for complete search history.

(56) References Cited

U.S. PATENT DOCUMENTS

| | | | |
|---|---|---|---|
| 7,254,482 B2* | 8/2007 | Kawasaki | G07C 5/008 340/435 |
| 7,386,376 B2* | 6/2008 | Basir | G07C 5/085 701/33.4 |
| 2007/0150138 A1 | 6/2007 | Plante | |
| 2008/0114502 A1* | 5/2008 | Breed | B60C 11/24 701/2 |
| 2010/0039294 A1* | 2/2010 | Feyereisen | G06K 9/0063 340/972 |
| 2010/0138094 A1 | 6/2010 | Stark et al. | |
| 2016/0086391 A1 | 3/2016 | Ricci | |

\* cited by examiner

*Primary Examiner* — Raymond N Phan
(74) *Attorney, Agent, or Firm* — Christopher R. Christenson; Kelly, Holt & Christenson PLLC

(57) ABSTRACT

A work machine includes at least one input device configured to generate input information. A controller is coupled to the input device(s) and is configured to store the input information in a buffer. The controller is configured to detect a trigger and responsively save at least a portion of contents of the buffer to memory. A wireless communication module is coupled to the controller and is configured to transmit an external capture signal when the controller detects the trigger.

20 Claims, 8 Drawing Sheets

WORK MACHINE EVENT CAPTURE

FIELD OF THE DESCRIPTION

The present invention relates to work machines. More specifically, the present disclosure relates to a system and method for capturing events related to work machines.

BACKGROUND

Work machines are used in a variety of contexts to perform work in a variety of industries such as the construction, agricultural, and forestry industries. Examples of work machines include dozers, front end loaders, backhoes, dump trucks, rock crushers, excavators, tractors, combines, skidders, knuckleboom log loaders, and swing machines. Many work machines are driven or controlled by an operator and are both complex and costly machines.

Many types of events can occur with respect to work machines. Examples of such types of events include operational events and non-operational events. An operational event occurs during operation of the work machine and may be an internal operational event, such as a failure of an internal component of the work machine, or an external operational event, such as the work machine becoming oriented in a way that threatens a rollover. A non-operational event occurs when the work machine is not operating on a jobsite. Examples of non-operational events include theft, vandalism, or other types of mischief.

Since work machines are generally costly machines to fix or replace, it is advantageous to identify or capture event information as quickly as possible such that remedies can be provided. When such events occur, the operator is often not in a position to know exactly what happened. However, in many jobsites, there is often pressure from the job schedule to quickly determine and remedy the cause of an event. Accordingly, it is desirable to provide work machine event capture that quickly captures comprehensive work machine event information such that the events can be addressed more quickly and comprehensively.

The discussion above is merely provided for general background information and is not intended to be used as an aid in determining the scope of the claimed subject matter.

SUMMARY

A work machine includes at least one input device configured to generate input information. A controller is coupled to the input device(s) and is configured to store the input information in a buffer. The controller is configured to detect a trigger and responsively save at least a portion of contents of the buffer to memory. A wireless communication module is coupled to the controller and is configured to transmit an external capture signal when the controller detects the trigger.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Work machines are now generally being provided with cameras and features such as "bird's eye view," IMU's (inertial measurement units) and Bluetooth microphones within the cab of the work machine. By using these elements, as well as other elements of the work machine, embodiments provided herein can generally provide a system that acquires and stores machine data, video, and audio, on a loop that is constantly buffering first-in, first-out. Multiple different type of triggers can be used to save this buffered data for future use or analysis. For example, an operator of a work machine can command a save operation of the buffer and be prompted to give verbal feedback about what is being recorded. Examples of things the operator may want to record and provide information on include odd behaviors with the work machine, issues with the environment, such as an issue with the haul road, issues with other equipment, such as crushers or conveyers, etc. Additionally, the work machine can sense an event such as a collision or rollover and the work machine would then create a record from the data that is within the buffer as well as for some period after the collision or rollover. The work machine may also be in the vicinity of an event occurring with respect to a different work machine such that the other work machine could communicate to others to also store their buffers so that multiple perspectives can be recorded.

In some embodiments, improved event capture can be used to support security features for the jobsite. For example, a central operator, such as a site foreman, may issue a "lockup" command or other suitable security command to all work machines on a jobsite at an end of the work day (either via their phones or some other suitable wireless communication) that communicates to the work machine so that the site is locked up. A work machine may then be configured as a security device after it receives such security command and the cameras as well as other suitable sensors of the work machine could be used to detect motion or other activity and record such activity for later analysis or reporting to appropriate persons, such as the authorities and/or the site foreman.

Figure 1:
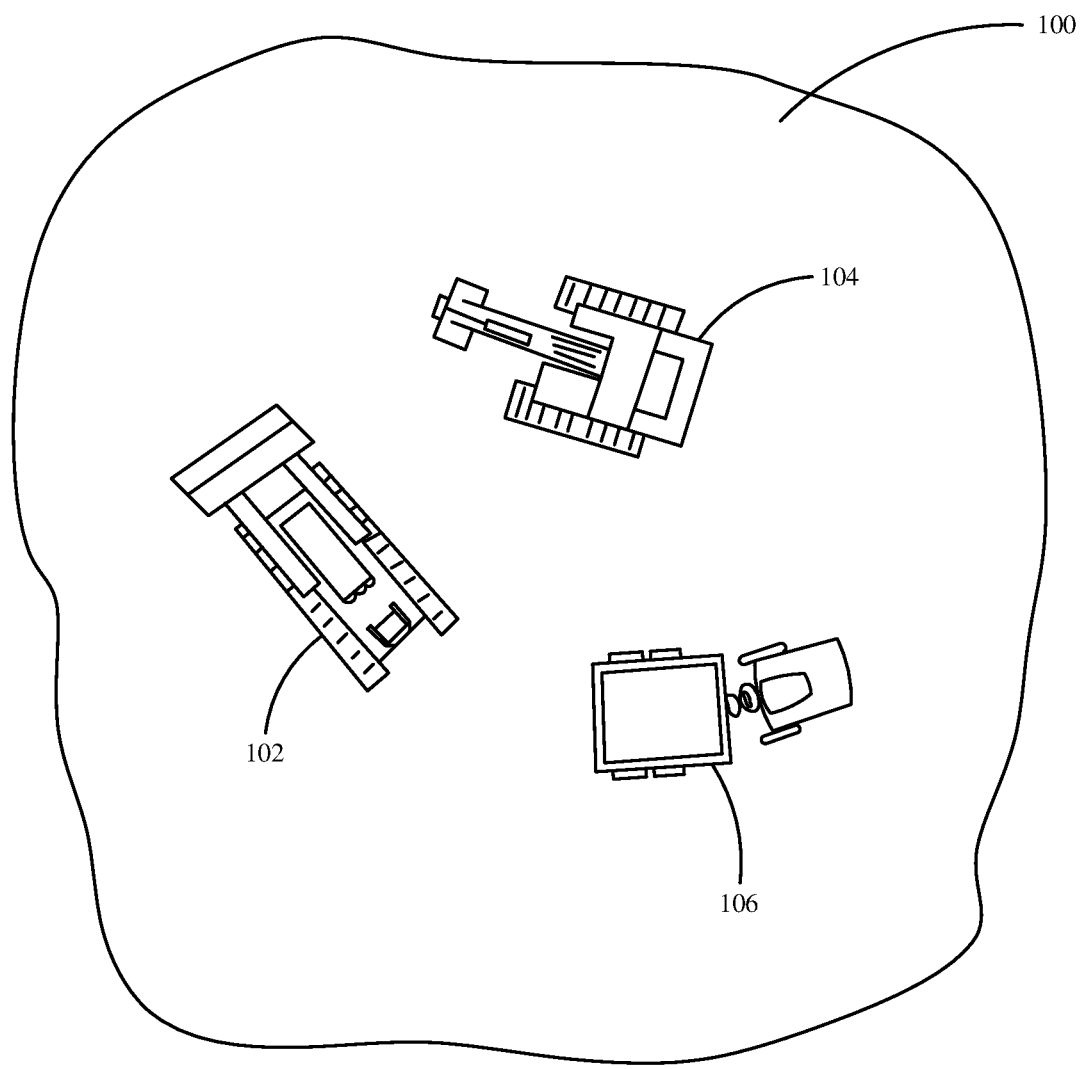
FIG. 1 is a diagrammatic top view of a jobsite having a plurality of work machines.

FIG. 1 is a diagrammatic top view of a job site having a plurality of work machines. As shown in FIG. 1, jobsite 100 may include dozer 102, backhoe 104, and dump truck 106. Additionally, as shown in FIG. 1, work machines 102, 104, and 106 are within jobsite proximity in that they are within visual line of site of one another. As set forth above, one aspect of embodiments described herein, is the ability of a first work machine, such as dozer 102 to detect an event trigger, or to receive an event trigger manually from an operator of dozer 102, and to wirelessly trigger other work machines, such as backhoe 104 and/or dump truck 106 to save their first-in, first-out buffers such that event information can be captured from multiple perspectives, or at least one perspective external to the work machine that detects or otherwise receives the trigger.

Figure 2:
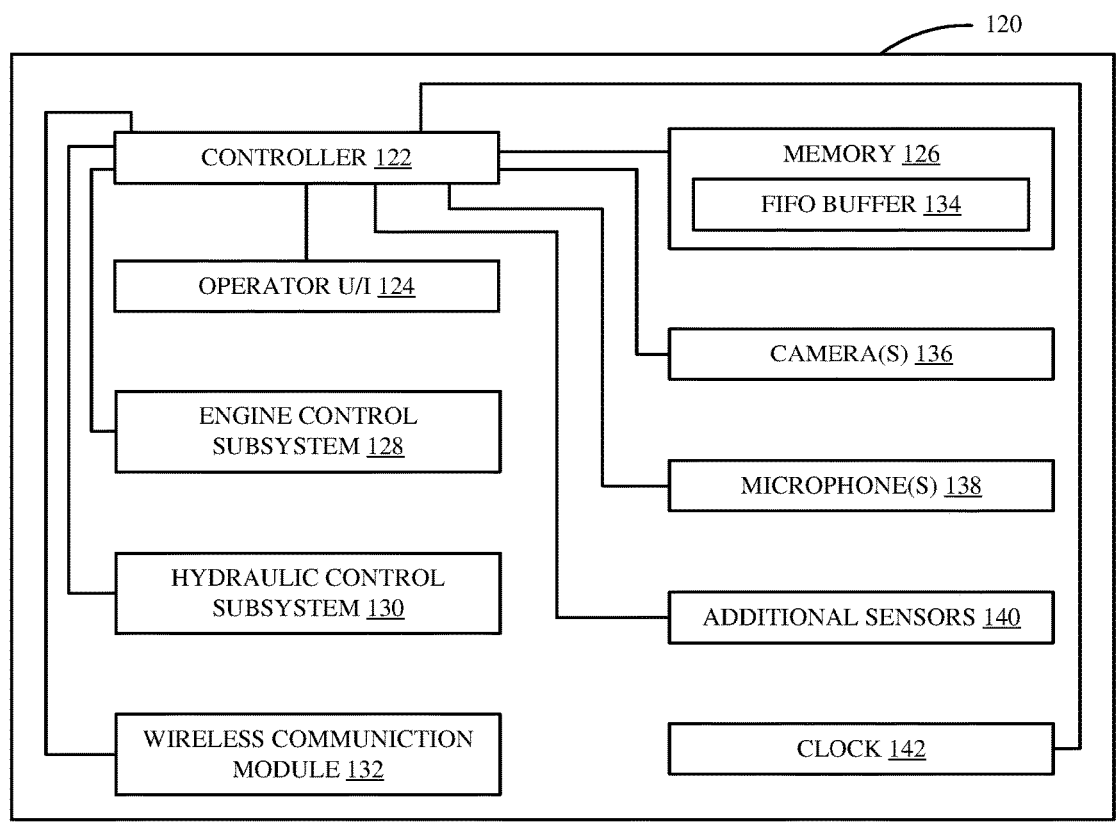
FIG. 2 is a block diagram of a work machine having improved electronic event capture in accordance with one embodiment.

FIG. 2 is a block diagram of a work machine having improved electronic event capture in accordance with one embodiment. Work machine 120 is illustrated as a box, but may be any of work machines 102, 104, or 106. Work machine 120 includes controller 122 that is coupled to operator user interface 124. Controller 122 can include one or more suitable processors that execute software instructions to provide functions related to the work machine. The instructions may be stored within controller 122, or within memory 126, which is coupled to controller 122. In one embodiment, controller 122 includes a microprocessor.

Operator UI component 124 generally configured to receive one or more inputs from the operator of the work machine to control various functions of the work machine. Note, operator UI component 124 need not receive each and every control input provided by the operator. However, in some embodiments, it is expressly contemplated that even relatively mechanical operations, such as working a lever or turning a dial are transduced or otherwise sensed by suitable electronic encoders, such that controller 122 can receive an input that is indicative of the operator's action.

As shown in FIG. 2, controller 122 is also coupled to engine control subsystem 128. In some embodiments, controller 122 may include control functions for the engine, or it may simply communicate with an engine control unit (ECU) to receive information regarding various parameters of the engine. Such parameters may include throttle position, oil temperature, engine RPMs, cooling temperature, etc. Essentially, any parameter related to the operation of the engine of the work machine that is controlled or monitored by engine control subsystem 128 can be provided to controller 122.

Controller 122 is also coupled to hydraulic control subsystem 130 such that one or more parameters related to the hydraulic system of the work machine can be monitored and stored in the buffer. Examples of such hydraulic system parameters include hydraulic fluid level, hydraulic fluid pressure, and hydraulic fluid temperature, and/or presence of any air in the hydraulic fluid.

Wireless communication module 132 is coupled to controller 122 and provides controller 122 with the ability to communicate wirelessly with other work machines or devices. Wireless communication module 132 may include one or more components such that it can communicate in accordance with various wireless communication specifications including, without limitation, Bluetooth, Wi-Fi, cellular, satellite, as well as any other suitable wireless communication technology, such LTE, or communication technologies yet to be developed. In one particular embodiment, wireless communication module 132 includes a cellular data connection as well as a relatively short-range wireless communication module, such as Wi-Fi, Bluetooth, or Zigbee.

Memory 126 is coupled to controller 122 and includes any suitable combination of volatile and non-volatile memory in order to support the operation of work machine 120. Memory 126 may include all of the instructions necessary to be executed by controller 122 in order to provide all functions of the work machine. Additionally, memory 126 includes FIFO buffer 134. Preferably, FIFO buffer 134 is provided in non-volatile memory such that if the work machine is suddenly stopped or otherwise disabled, the contents of FIFO buffer 134 would remain. However, it is expressly contemplated that embodiments can be practiced where FIFO buffer 134 is provided entirely in volatile memory. FIFO buffer 134 is embodied in a defined portion of memory or in a selected memory address range such that it has a fixed capacity. Controller 122 acquires information from the various sensors and other inputs related to the work machine and saves this information to FIFO buffer 134. With each successive save, the previously-saved information is moved such that at some point, the FIFO buffer is essentially full and each new save will cause contents saved in a previous iteration to be erased. Thus, the buffer is a first-in, first-out buffer.

While buffer 134 is shown as a single block, it is expressly contemplated that buffer 134 may include a plurality of sub-FIFO buffers each configured for a certain type of information. For example, FIFO buffer 134 may have a video FIFO sub-buffer that stores information from one or more cameras, an audio sub-buffer that stores information from one or more microphones, and a sensor information sub-buffer that stores information from the work machine sensors. When an event occurs, controller 122 copies or otherwise transfers a selected range, or all of the contents of FIFO buffer 134 to another portion of memory 126 such that it will not be overwritten by subsequent operation of the FIFO buffer 134.

Controller 122 is coupled to one or more cameras 136. Cameras 136 may include a plurality of cameras that are arranged to provide a "bird's eye view" for the operator. Additionally, or alternatively, cameras 136 can also include different types of cameras as well as any combination of cameras. For example, cameras 136 can include 360-degree cameras, infrared cameras, thermal vision cameras, and night vision cameras. The various cameras may be fixedly mounted relative to the work machine or they may be coupled to suitable pan-tilt-zoom hardware under the control of controller 122, such that the camera can be configured to move to a selected view based on signals from controller 122.

One or more microphones 138 are coupled to controller 122 and provide audio information to controller 122 that can be saved in FIFO buffer 134, as well as used for receiving audio commands from the operator. Thus, one microphone may be a Bluetooth-based microphone that is disposed in the cab of the work machine. Yet another microphone may be disposed external to the cab of the work machine and arranged to detect sounds related to work machine operation. Examples of such work machine operation can include a rock crushing operation, operation of the engine, etc. Microphone(s) 138 can be any combination of directional and/or omnidirectional microphones in order to detect any suitable sounds that may be relevant to the operation of work machines. Often, sounds are some of the first indicators of events with respect to work machines. For example, in the operation of a rock crusher, an operator may hear a loud clunk like a gear tooth going through the crusher. This information may be stored in FIFO buffer 134. The operator may then generate a trigger, and provide a comment in the cab of the work machine such as "An odd noise just came from the crusher." Both the audio from the sound of the clunk, and the comment from the operator can then be moved from FIFO buffer 134 to a selected location in memory 126 such that the buffer, including the sound, comment, and any other relevant work machine information, can be analyzed.

As shown in FIG. 2, a variety of additional sensors 140 may also be coupled to controller 122 in order to provide an array of different information to controller 122. Essentially, any parameter having relevance to a work machine that can be detected or otherwise transduced by additional sensors 140 and provided to controller 122 can be saved in FIFO buffer 134.

In one embodiment, controller 122 is coupled to clock 142 such that all of the contents of FIFO buffer 134 are also tagged with real-time information. However, in embodiments where controller 122 has its own real-time clock, or communication module 132 can provide an indication of time, separate clock 142 may be omitted.

Figure 3:
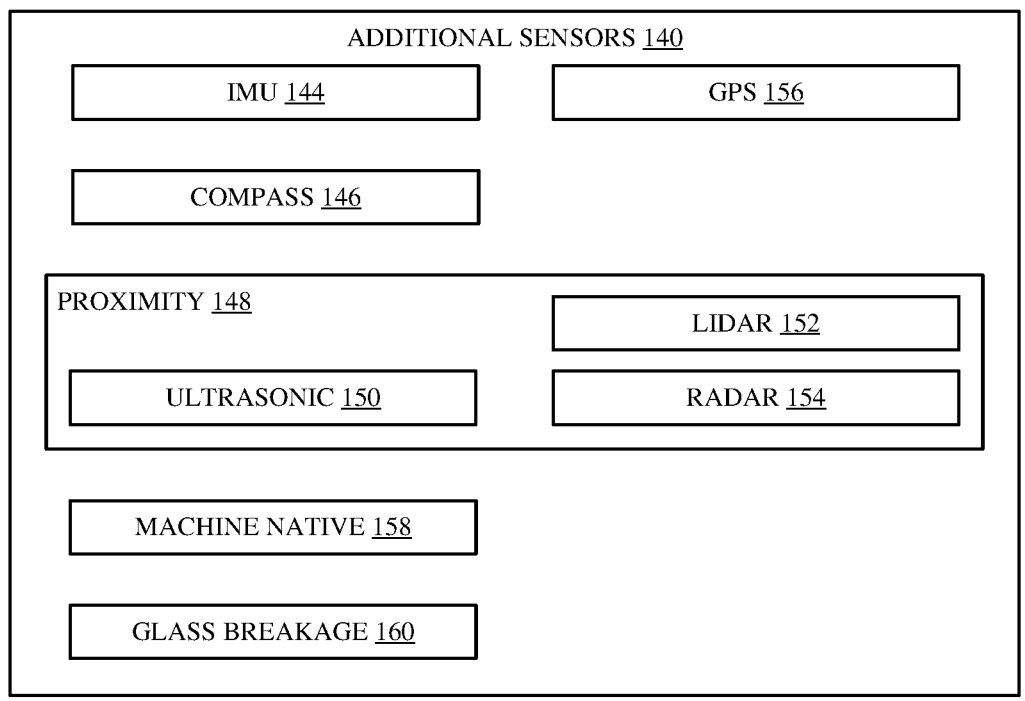
FIG. 3 is a block diagram illustrating different types of additional sensors that can be used to acquire information related to work machine events.

FIG. 3 is a block diagram illustrating different types of additional sensors that can be used to acquire information related to work machine events. Additional sensors 140 can include IMU 144, which is an electronic device that measures and reports a body specific force, angular rate, and sometimes magnetic fields surrounding the work machine using a combination of accelerometers and gyroscopes. Additionally, sensors 140 may include electronic compass module 146 that provides an indication of magnetic north to controller 122. However, some inertial measurement units 144 may provide information regarding the magnetic field surrounding the body, and thus it is expressly contemplated that IMU 144 and compass 146 may be combined, in some embodiments.

While embodiments described herein generally receive various manual triggers from operators of the work machine, it is expressly contemplated that various automatic triggers can be set either by a manufacturer, or an operator of the work machine. One example of an automatic trigger is setting a threshold with respect to signals provided by IMU 144. For example, in a collision, the acceleration experienced by IMU 144 will be significantly higher than normal work machine operation. Thus, setting a collision threshold acceleration such that the contents of FIFO buffer 134 can be automatically saved when such collision occurs, can help ensure that the contents of FIFO buffer 134 will be preserved even if the operator is unable to issue a manual trigger. Another example of an IMU-based automatic trigger is the IMU providing a signal indicating that the work machine is oriented at an angle above a critical rollover threshold. Again, this automatic trigger can be used to automatically save the contents of FIFO buffer 134 if the operator is unable to issue a manual trigger.

Additional sensors 140 can also include various types of proximity sensors 148. Examples of proximity sensors include ultrasonic sensor 150 as well as LIDAR (light detection and ranging) sensor 152. LIDAR sensor 152 is configured to provide a signal relative to a distance to target by illuminating a target with a pulsed laser light and measuring the reflected pulses with a sensor. LIDAR sensor 152 can be configured to direct this pulsed laser light in different directions to determine a distance to the environment surrounding a work machine. Additionally, or alternatively, proximity sensor(s) 148 may include radar module 154. Radar module 154 is similar to LIDAR sensor 152 but uses radio waves to determine range, angle, or velocity of objects relative to the work machine.

Additional sensors 140 may include a positional detection sensor, such as a GPS sensor. In embodiments where a GPS sensor 156 is used, it is contemplated that the time signal from the Global Positioning System can be used to indicate real-time information to controller 122, and thus clock 142 may be omitted. Additionally, providing positional information related to the operation of the work machine and storing the positional information in FIFO buffer 134 can help inform event capture with respect to where the work machine was when the event occurred. For example, if the work machine is a dump truck, and the operator is driving the truck on a haul road and experiences a soft or weak spot in the haul road, the operator may manually trigger an event and record a comment such as "just hit a soft spot." Then, the contents of FIFO buffer 134 including the operator's comment, as well as the GPS position of the dump truck when the event occurred will be stored in memory 126 for later analysis. Thus, operators of other dump trucks can be instructed to use caution at that the position on the haul road and a site foreman or other responsible party can be instructed to remedy that portion of the haul road.

Additional sensors 140 may also include machine native sensors 158. These are sensors that are particular to a given work machine and thus vary depending on the type of work machine. However, as set forth above, any sensor reporting information that is relevant to a particular work machine can have its signal recorded in FIFO buffer 134 by controller 122.

Yet another type of additional sensor 140 is glass breakage sensor 160. Glass breakage sensor 160 can be any suitable glass breakage sensor now known or later developed that is coupled to glass of the cab of the work machine. Glass breakage sensor 160 is particularly useful for capturing security events related to the work machine.

Figure 4:
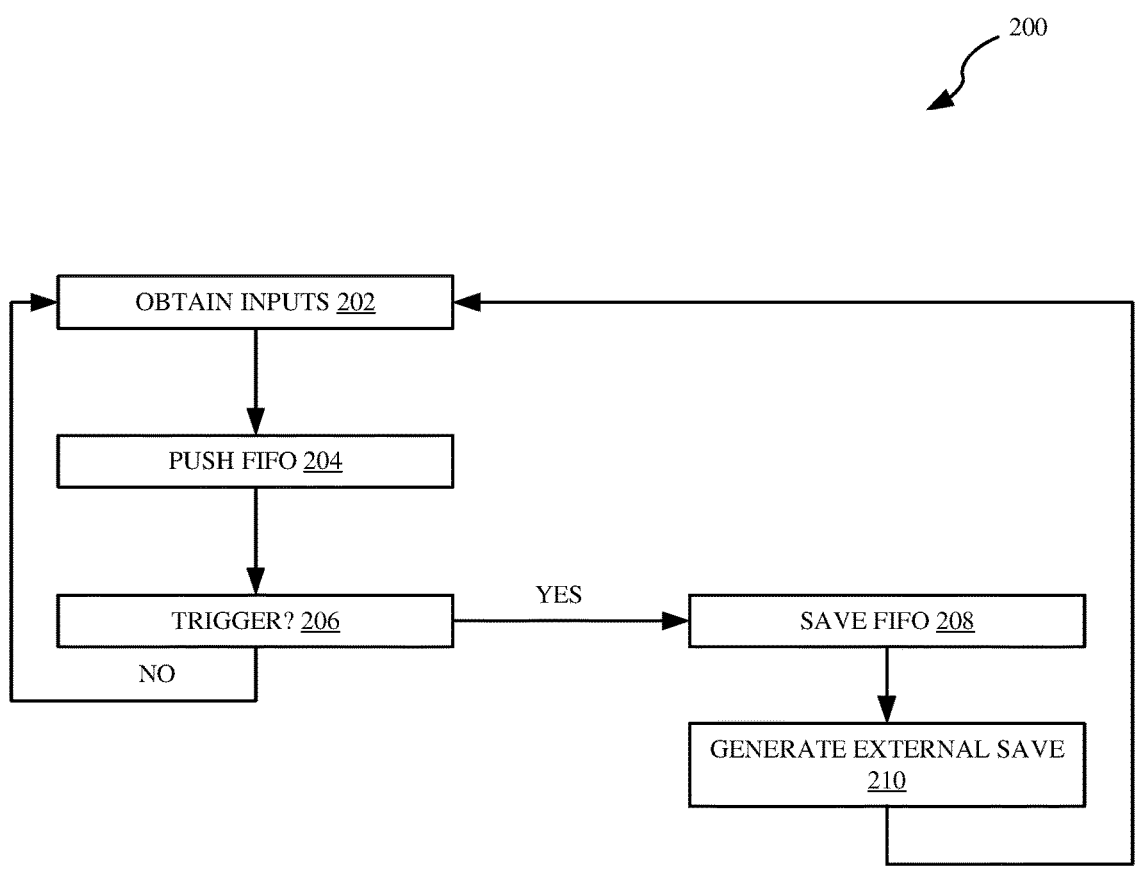
FIG. 4 is a flow diagram of a method of capturing work machine events in accordance with one embodiment.

FIG. 4 is a flow diagram of a method of capturing work machine events in accordance with one embodiment. Method 200 begins at block 202 where a controller of the work machine, such as controller 122, obtains various inputs related to the work machine. This can be a variety of inputs ranging from camera feeds, microphone signals, IMU signals and additional sensors. The controller then pushes the input information into a FIFO buffer, such as FIFO buffer 134, at block 204. At block 206, method 200 checks to see whether a trigger has occurred. As set forth above, there are manual triggers, and automatic triggers. If a trigger has not occurred, control returns to block 202 where another set of inputs is obtained and the method loops until a trigger is detected at block 206 where control passes to block 208. At block 208, the work machine saves the contents or a selected portion of FIFO buffer 134 to a different portion of the memory for later analysis. Then, at block 210, the work machine issues a wireless trigger signal to generate an external save to all work machines within wireless communication range. In this way, the other work machines that receive this wireless trigger signal will save their own local FIFO buffers in order to provide additional information with respect to the event. In one embodiment, the wireless trigger signal will include positional information from the triggering work machine such that on suitably equipped work machines having their own positional sensors, they can determine the location of the triggering work machine from their own location in order to direct one or more of their cameras and/or microphones at the triggering work machine. In this way, event information happening at a first work machine is captured by one or more additional work machines in order to provide more data for analysis of the event. Once the external save signal has been generated at block 210, control returns to block 202 where the triggering work machine again begins obtaining inputs, pushing the FIFO, and looping.

Figure 5:
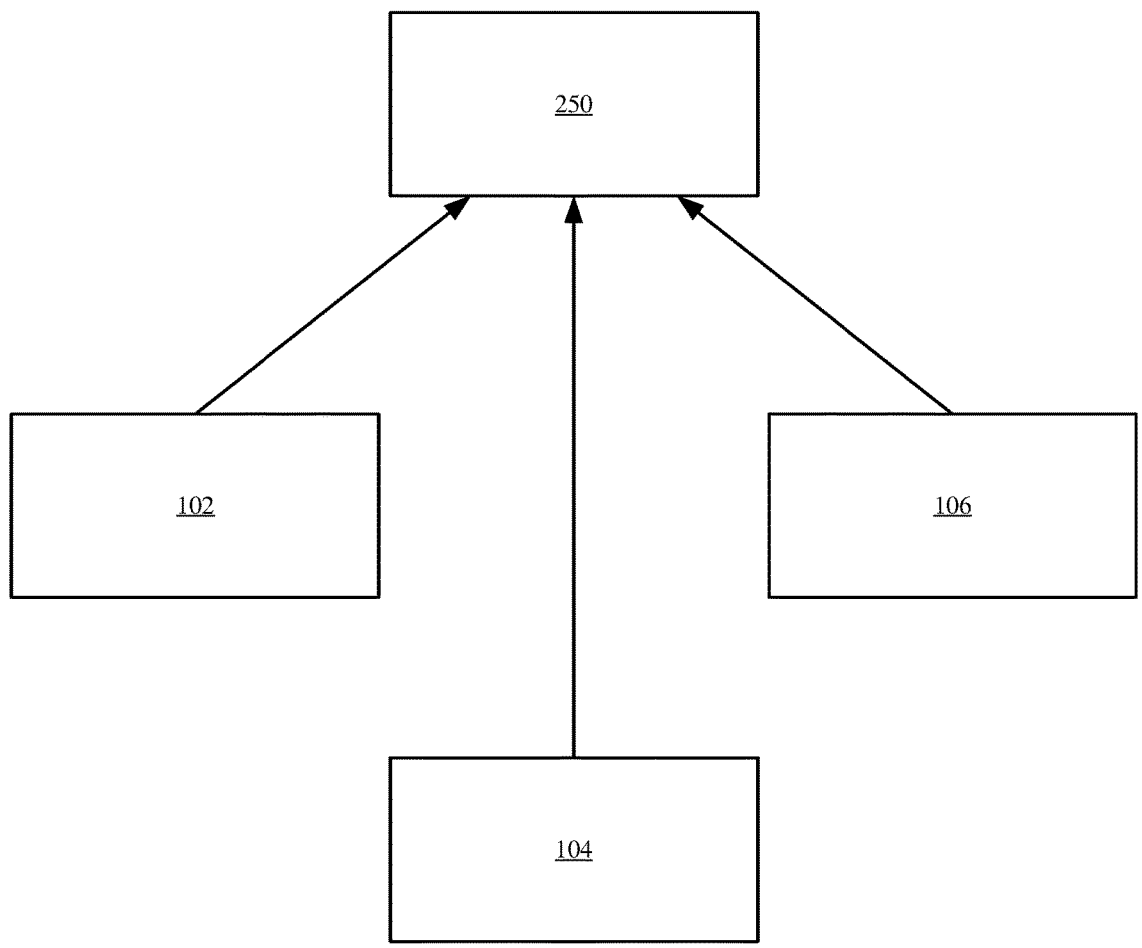
FIG. 5 is a block diagram illustrating a plurality of different work machines sending their event information to a back-office server in accordance with one embodiment.

FIG. 5 is a block diagram of plurality of different work machines sending their event information to a back-office server in accordance with one embodiment. As shown in FIG. 5, at the end of a work day, periodically, or on demand, each work machine can be configured to transmit its saved event information to server 250 which can aggregate the event information and group it by event for analysis and remediation at the back office. In embodiments where the time stamps of event information are provided by GPS module 156, the precision of that time signal is of such an extent that the event information may be considered to be essentially synchronized. Thus, event information from multiple different work machines can be analyzed using this "synchronized" time frame.

Figure 6:
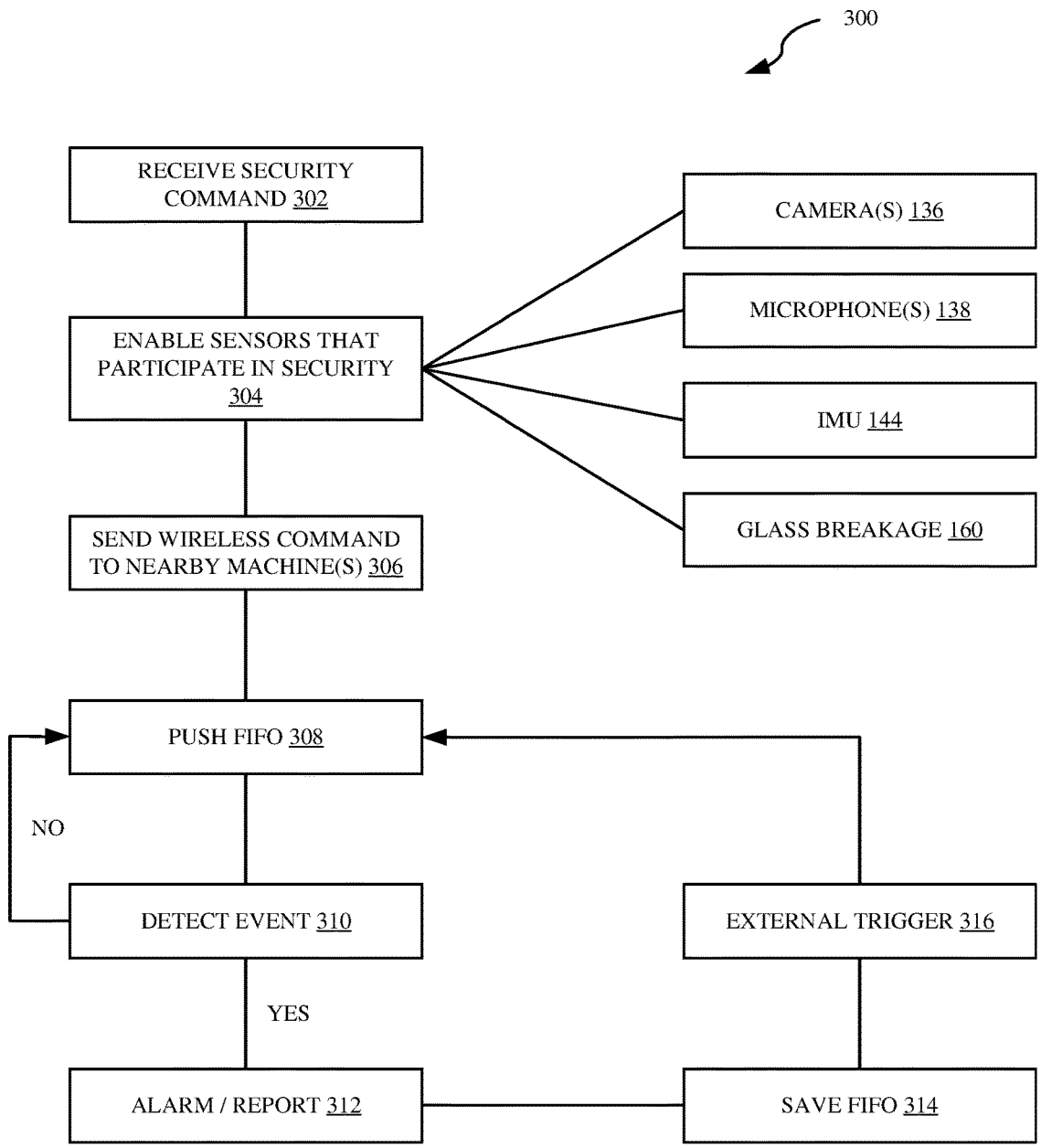
FIG. 6 is a flow diagram of a method of capturing security event information with work machines in accordance with one embodiment.

FIG. 6 is a flow diagram of a method of capturing security event information with work machines in accordance with one embodiment. Method 300 begins at block 302 where a work machine receives a security command from an operator. The operator may be a local operator of the work machine, or a central operator, such as a site foreman communicating the security command to the work machine via a wireless communication signal received by a suitable wireless communication module such as wireless communication module 132. Once the security command is received by the work machine, control passes to block 304 where the work machine enables or otherwise activates various sensors and devices that participate in security. It is expressly contemplated, that not all sensors and input devices of the work machine participate in the security of the work machine. For example, an oil pressure sensor would not participate in the security of the work machine, but a glass breakage sensor would. Examples of sensors that participate in security are one or more cameras 136, microphone(s) 138, IMU 144, and glass breakage sensor 160. Then, the work machine sends a wireless command to nearby work machines at block 306. This causes the other work machines receiving the wireless communication to enable their own sensors that participate in security and enter a security monitoring mode.

In a security monitoring mode, a work machine will repetitively obtain inputs from the sensors that participate in security (such as cameras, microphones, etc.), and push the FIFO buffer with the input information, as indicated at block 308. When the work machine detects an event, at block 310, control will then pass to block 312 where an alarm may be sounded, and the FIFO buffer information may be saved and reported to a responsible party, such as a site foreman and/or the authorities. Detecting an event at block 310 can include monitoring any individual or combination of sensors to identify a condition indicative of a security-related event. Certainly, a glass breakage sensor reporting glass breakage would indicate a security-related event. Additionally, movement detected by one or more night vision cameras may be indicative of a security event. However, movement detected by one more night vision cameras and movement of the work machine itself, potentially indicating tampering, would indicate a security event. Various templates for security events based on individual sensors and/or combinations of sensors can be set by the operator or the manufacturer of the work machine. At block 314, the local work machine saves the triggered event information in memory such that it can be later analyzed. Next, at block 316, the work machine generates a wireless external trigger signal to nearby work machines such that they can respond to or otherwise save their local FIFO buffers. As set forth above, in some embodiments, the external trigger signal may include a position of the triggering work machine such that directional sensors (such as microphones and cameras) can be trained on the triggering work machine to provide event capture information from the perspective of the nearby machines. This may help identify one or more persons involved in the security-related event of the triggering work machine.

Figure 7:
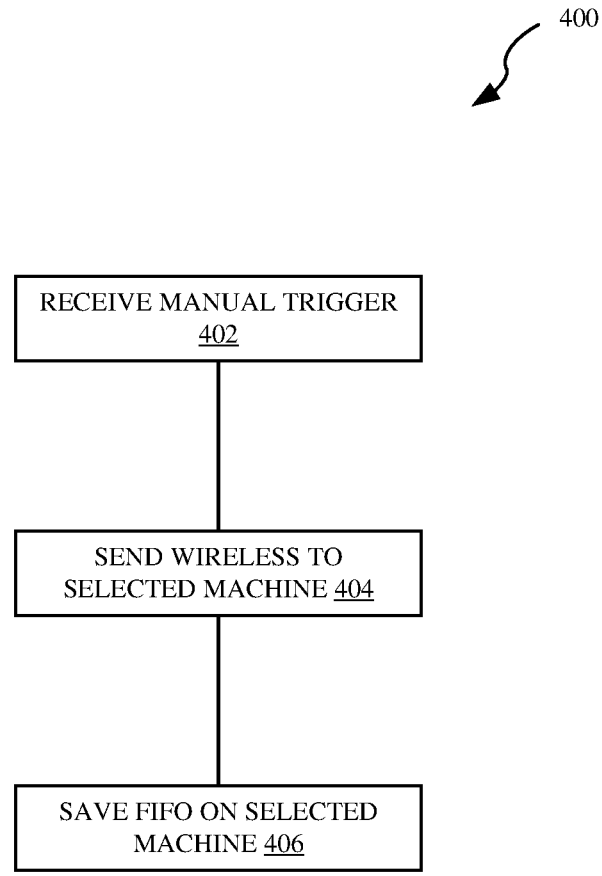
FIG. 7 is a flow diagram of a method of capturing work machine event information in accordance with another embodiment.

FIG. 7 is a flow diagram of a method of capturing work machine event information in accordance with another embodiment. Method 400 begins at block 402 where the work machine receives a manual trigger. This may be provided by an operator simply pressing a "trigger" button in the cab of the work machine, or issuing a verbal command, such as "event capture." Next, at block 404, a wireless trigger signal is sent to one or more nearby or selected work machines. At block 406, the FIFO of the triggering machine as well as the FIFO on the selected or nearby work machines are saved. In this way, event information regarding a work machine event is captured from multiple positions and/or advantage points. This helps facilitate a better understanding of the event to more quickly respond to the event with the appropriate remedy.

Figure 8:
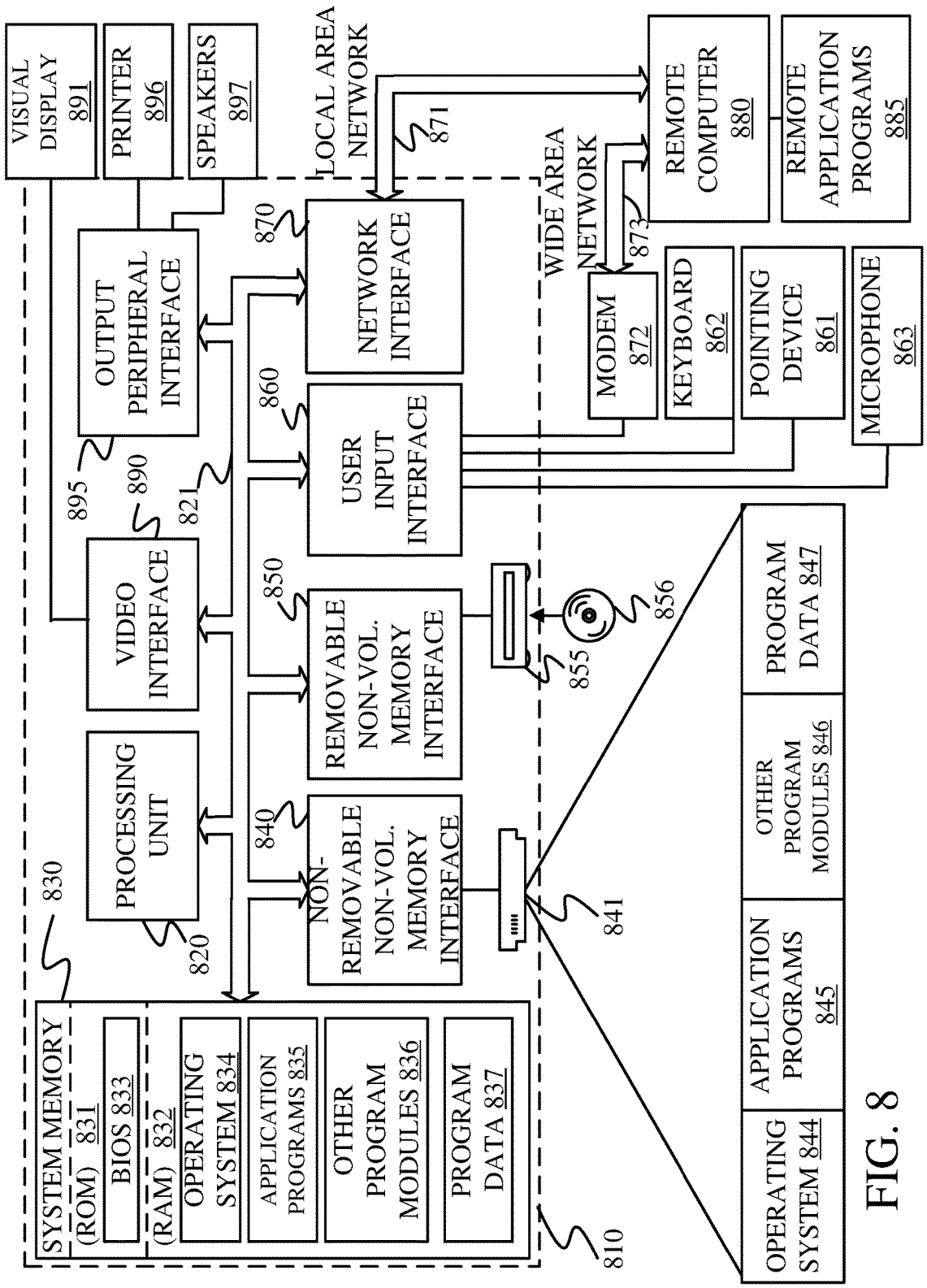
FIG. 8 is a block diagram of a computing system that can be used to support work machine event capture in accordance with one embodiment.

FIG. 8 is a block diagram of a computing system that can be used to support work machine event capture in accordance with one embodiment. FIG. 8 is one embodiment of a computing environment in which elements of FIG. 2, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise controller 122), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that any or all of the information discussed as displayed or stored information can also, in one embodiment, be output to, or retrieved from, a cloud-based storage.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A work machine comprising:
   at least one input device configured to generate input information;
   a controller coupled to the at least one input device and configured to store the input information in a buffer, the controller being configured to detect a trigger from an additional work machine relative to the work machine and responsively save at least a portion of contents of the buffer to memory; and
   a wireless communication module coupled to the controller and configured to transmit an external capture signal when the controller detects the trigger.

2. The work machine of claim 1, wherein the at least one input device includes a video camera.

3. The work machine of claim 1, wherein the at least one input device includes a microphone coupled to the controller.

4. The work machine of claim 1, wherein the at least one input device includes a plurality of input devices, the plurality of input devices including a camera, a microphone, and at least one additional sensor.

5. The work machine of claim 1, wherein the trigger is a manual trigger actuatable by an operator of the work machine.

6. The work machine of claim 1, wherein the trigger is an automatic trigger configured to occur based on one or more input conditions.

7. The work machine of claim 1, and further comprising a clock coupled to the controller and configured to provide a time signal and wherein storage of input information in the buffer is referenced to the time signal.

8. The work machine of claim 2, wherein buffer is a first-in, first-out (FIFO) buffer.

9. The work machine of claim 3, wherein the microphone is disposed within a cab of the work machine.

10. The work machine of claim 4, wherein the at least one additional sensor includes an inertial measurement unit.

11. The work machine of claim 4, wherein the at least one additional sensor includes a positional detection sensor.

12. A method of capturing event information related to a work machine, the method comprising:
   receiving input information relative to the work machine;
   saving the input information in a buffer;
   detecting a trigger;
   saving at least a portion of the buffer; and
   generating a wireless external trigger signal to at least one other work machine, the wireless external trigger signal being configured to cause the at least one other work machine to save at least a portion of a buffer that is local to the at least one other work machine.

13. The method of claim 12, wherein the trigger is a manual trigger received from an operator of the work machine.

14. The method of claim 12, wherein the trigger is an automatic trigger.

15. The method of claim 12, wherein the input information includes video information received from at least one camera mounted to the work machine, and audio information from at least one microphone disposed within a cab of the work machine.

16. The method of claim 12, and further comprising receiving an indication of time, and saving the input information in the buffer referenced to the time signal.

17. A method of capturing security event information with a work machine, the method comprising:
   receiving a wireless security command to enable a security mode of the work machine;
   enabling sensors of the work machine that are related to security;
   transmitting a wireless communication signal to at least one other work machine to cause the at least one other work machine to enter security mode;
   receiving input information from the sensors of the work machine that are related to security;
   saving the input information in a first-in, first-out buffer;
   automatically detecting a security event;
   in response to automatically detecting the security event, saving at least a portion of contents of the buffer; and
   generating a wireless external trigger signal to the at least one other work machine to cause the at least one other work machine to save at least a portion of a buffer that is local to the at least one other work machine.

18. The method of claim 17, wherein automatically detecting the security event includes detecting motion proximate the work machine based on a camera signal.

19. The method of claim 17, wherein the wireless external trigger signal includes information indicative of a position of the work machine.

20. The method of claim 17, wherein receiving a wireless security command occurs at an end of the work day.

* * * * *